Nov. 19, 1957 M. B. ARCHER ET AL 2,813,736
REMOTE CONTROLLED KNOT TYING DEVICE
Filed Dec. 5, 1955 3 Sheets-Sheet 1

INVENTOR.
MONTE B. ARCHER
GEORGE W. ARCHER
BY Townsend, Townsend, & Hoppe
ATTORNEYS

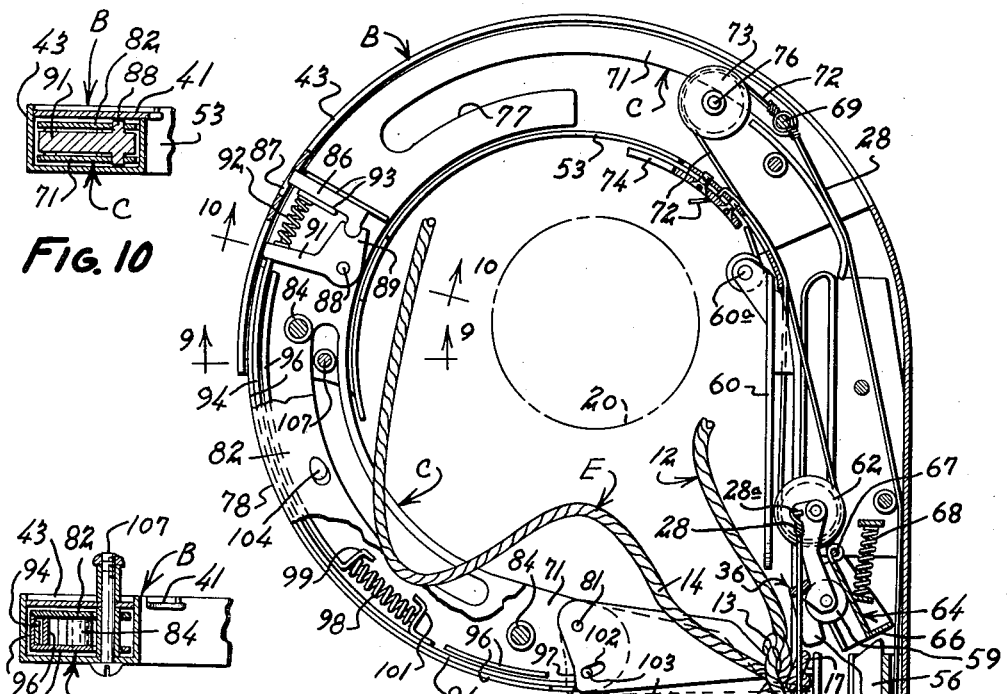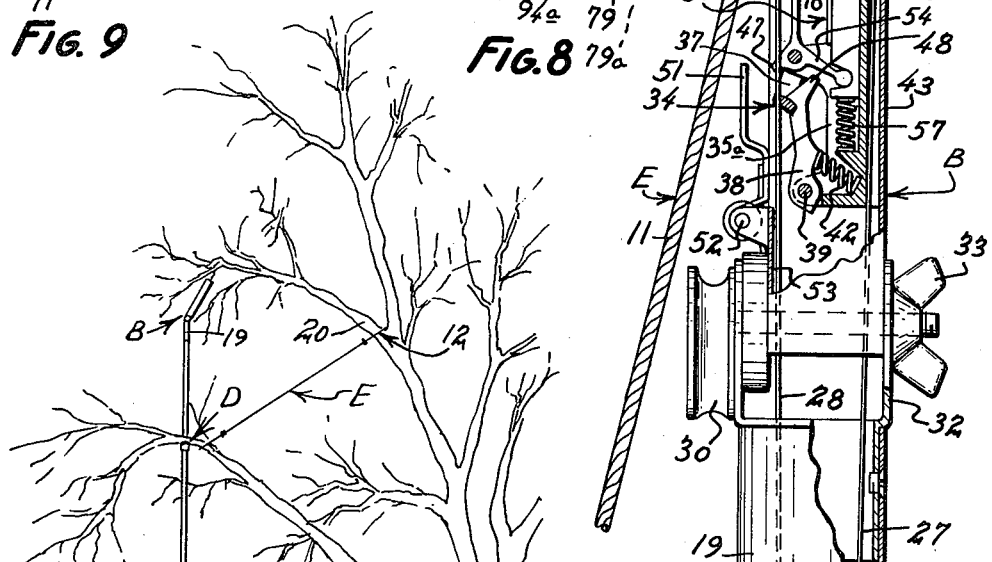

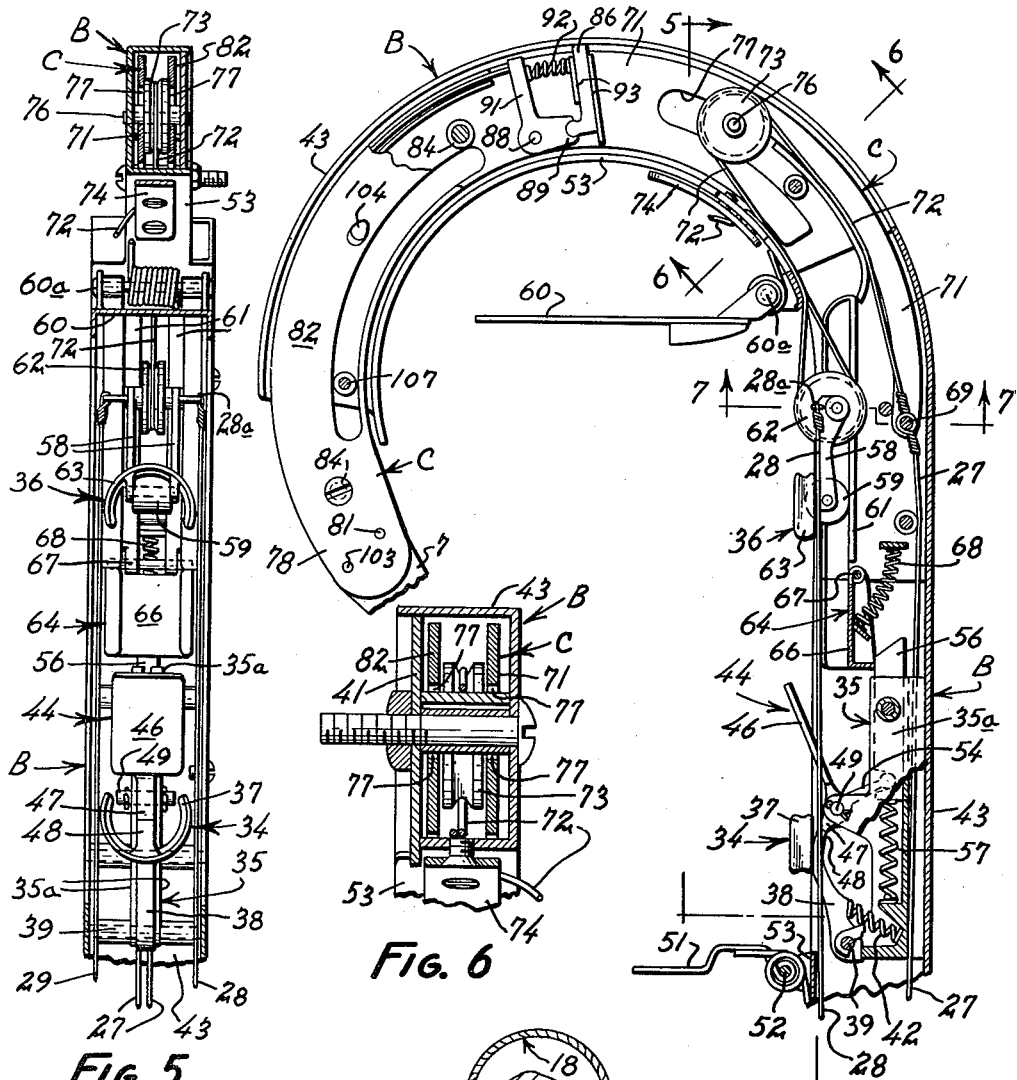
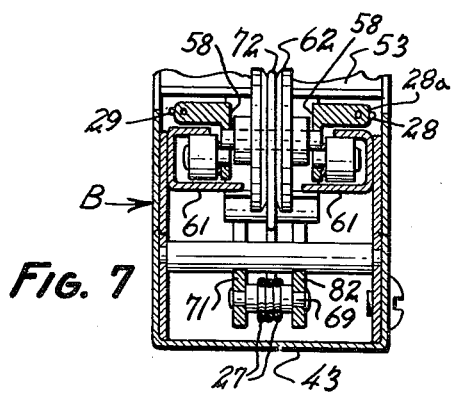
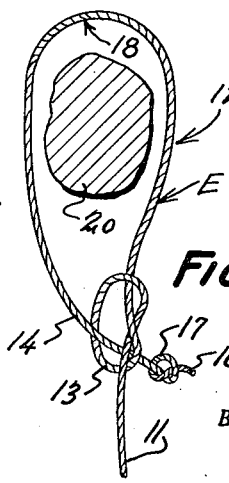

United States Patent Office 2,813,736
Patented Nov. 19, 1957

2,813,736

REMOTE CONTROLLED KNOT TYING DEVICE

Monte B. Archer, Suisun, and George W. Archer, Manton, Calif.

Application December 5, 1955, Serial No. 551,034

12 Claims. (Cl. 289—17)

This invention relates to a new and improved rope tying device and to a form of knot tied thereby.

In the cultivation and harvesting of certain species of tree grown fruits and nuts, it is customary to provide support for the fruit bearing tree limbs to prevent the limbs from breaking or unduly sagging under their own weight. In certain types of orchards, such as pear orchards the fruit bearing limbs are commonly tied and supported by heavy twine to one or more of the main or primary branches of the tree. Although various types of mechanical string or rope tiers have been proposed in the past to facilitate the job, it is perhaps the more common practice for growers to hand-tie the limbs which necessitates workmen using high ladders or portable scaffolds to reach the higher limbs. Generally speaking, in any sizeable orchard operation, the labor and expense in hand-tying the tree limbs by conventional practices constitutes a significant item in the over-all economics of operations. Hence, it is desirable to provide a mechanical tying device which can be operated to tie an appropriate form of knot around a tree limb at a point remote from the operator. As will more fully appear hereinafter, the present device may be mounted to the end of a pole or handle of substantial length which permits the workman to manipulate the device to secure a loop around an upper limb without the use of ladders or scaffolds.

A principal object of the invention is to provide a rope or twine tying device capable of being operated in the manner briefly mentioned above.

An important feature of the invention is that when the device is properly threaded preparatory to engaging it to a limb, the mechanism operates to tie a non-slip type noose or loop around the tree limb. In this connection certain other types of string tying devices of which we have knowledge operate to tie a slipknot which may eventually operate to constrict tightly around and strangulate the limbs about which it is tied. The present device operates to tie an open, non-slip noose or loop.

Another feature of the invention is that the operating mechanism for completing the tie of a knot around a limb is actuated by pulling or jerking on the rope or twine itself. Hence, it is possible and practical to mount the operating portions of the device on a relatively long pole or handle of any desired length which can be carried so that a workman can operate the device at a remote distance simply by jerking or tugging on the standing part of the rope or twine.

Another object of the invention is to provide a unique non-slip type knot or noose particularly useful in the tying of orchard tree limbs.

Other numerous objects and advantages of the invention will become apparent upon reading the following specification and referring to the accompanying drawings in which similar characters of reference represent corresponding parts in each of the several views.

In the drawings:

Fig. 3 is a partially schematic view showing how the handle portion of the unit with its adjustable jack may be utilized to support a lower limb of a tree in making a hand tie around said limb.

Fig. 4 is a longitudinal partial sectional view of the head portion of the device in one operating condition.

Fig. 5 is a view partly in section taken substantially along line 5—5 of Fig. 4.

Fig. 6 is an enlarged sectional view taken substantially on line 6—6 of Fig. 4.

Fig. 7 is an enlarged sectional view taken substantially on line 7—7 of Fig. 4.

Fig. 8 is a side elevational view of the device showing portions broken away in section and showing the position of the parts at the conclusion of a tying operation.

Fig. 9 is a sectional view taken on line 9—9 of Fig. 8.

Fig. 10 is a sectional view taken on line 10—10 of Fig. 8.

Fig. 11 illustrates the type of knotted noose tied by the device.

Figures 1, 2, 12:
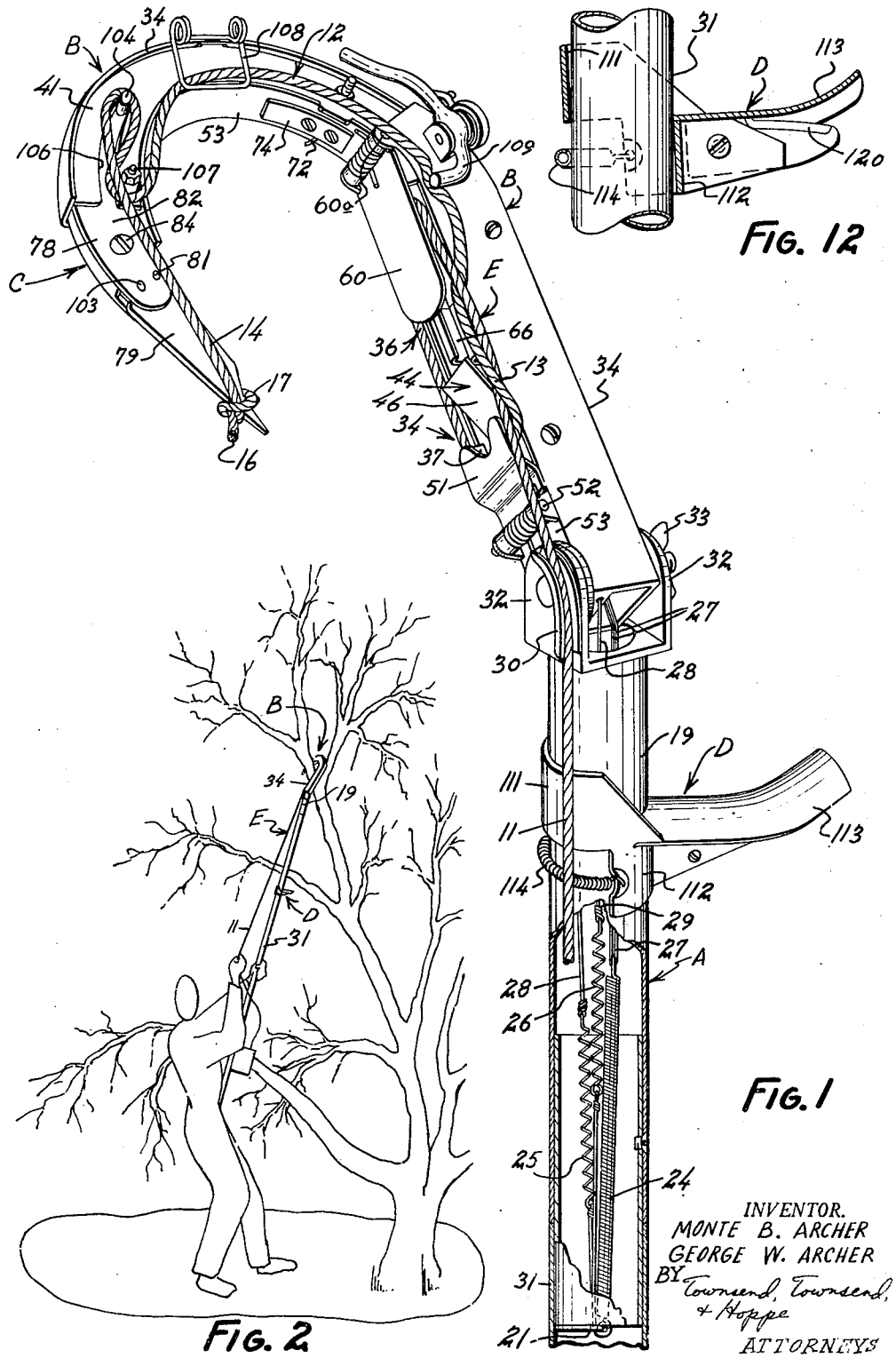
Fig. 1 is a perspective view of a tying device embodying the invention showing a length of twine threaded to the device preparatory to actuation of the mechanism.
Fig. 2 is a partially schematic view in perspective showing the manner in which the device may be operated from the ground in tying loops around tree limbs.
Fig. 12 is an enlarged fragmentary sectional view of the slidable jack assembly.

Referring now more specifically to the drawings, the device therein illustrated is shown as comprising a tubular body or upper handle portion A, and a generally hooked-shaped head portion B mounting an arcuate slide assembly C. An adjustable jack, indicated generally at D, is slidably mounted on the handle portion of the device. In certain of the drawings, the rope, string, twine or flexible wire strand (hereinafter generally referred to as rope) in connection with which the device is utilized is indicated generally at E.

In general, a tying device constructed in accordance with the invention when properly threaded with rope E in the manner indicated in Fig. 1 may be positioned with its head portion B hooked over a tree limb or other body. The mechanism may be actuated by pulling or jerking on the standing part 11 of the rope E to cause a knotted noose or loop such as indicated generally at 12 and particularly of the type shown in Fig. 11 to be tied around the limb or body.

More specifically and as shown in Fig. 11, the noose or loop 12 is defined by an overhand knot 13 formed in the standing part 11 of the rope and which is tensioned to tightly embrace the running part of the rope 14 projected through the overhand 13. The running end 16 of the rope is formed with a protuberance, such as a knotted overhand 17, to secure the running end against slippage through the overhand 13 when the tie is completed. The enlarged noose or bight portion 18 is shown in Fig. 11 as embracing a limb or branch 20 of a tree.

The tubular body or upper handle portion of the unit, heretofore indicated generally at A, is shown as comprising a tube 19 in which is mounted a transverse spring anchoring plate 21 to which is secured springs 24, 25 and 26. The unanchored ends of the springs are connected to wires 27, 28 and 29 which extend upwardly through tube 19 and are connected to various operating parts of the mechanism located within head B as will more fully appear. The lower end of tube 19 may be telescoped over and rigidly secured to the upper end of an elongate handle extension or pole 31 of desired length to permit an operator to position and operate the working end of the instrument from a remote point. As above indicated, by providing a relatively long handle, it is possible for an operator to project the working head of the tool high up through the branches of a tree to secure a tie around a high limb without having to resort to ladders or scaffolds. Consequently the length of the handle extension 31 is largely dependent upon the height or distance away from the operator that the tool must be operated.

The upper end of the tube 19 is provided with a bifurcated or U-shaped bracket 32 for receiving and pivotally supporting the lower end of head portion B. As shown in the drawings, a conventional thumb clamp screw 33 is projected through registering apertures formed in the bracket 32, the base end of head B, and rope guide member 30 and functions to pivotally support the head to the bracket in any number of preselected positions.

The head portion of the device, heretofore indicated generally at B, comprises a generally hook-shaped housing or casing 34 which may be formed by welding or otherwise assembling together a series of flat plate members as shown in the drawings or obviously the casing or housing unit 34 may be formed of one or more castings or extrusions. The hook-shaped casing 34 houses the slide assembly C for slidable movement of the latter from a retracted position, as shown in Fig. 1, to an extended knot tying position, as shown particularly in Fig. 8.

The head mechanism B further comprises a pair of overhand knot supporting members including a bobbin assembly 35 and a shuttle assembly 36. The bobbin assembly 35 comprises, more specifically, a grooved rope supporting guide head 37 and an integral arm extension 38 pivotally secured as at 39 between the sides of bobbin frame 35ᵃ. A coil spring 42 interposed between bobbin frame 35ᵃ and arm extension 38 functions to normally spring bias the bobbin head to its normal position as shown in Fig. 4. As will be more fully explained hereinafter, both the bobbin 34 and the shuttle 36 are adapted to upset or tilt within casing 34 at the conclusion of the knot tying operation so as to release the overhand knot 13 supported by the bobbin and shuttle during operation of the device. The bobbin 34 is adapted to be upset or tilted at the appropriate time through actuation of a trigger latch mechanism indicated normally at 44.

More specifically, the mechanism 44 comprises a three arm bell crank including a trigger arm 46 and a latch arm 47 engageable with a complementary lug extension 48 formed integral with the underside of the bobbin head 37. The bell crank is pivotally mounted by pin 49 supported between opposite sides of the bobbin frame 35ᵃ and with the trigger arm 46 normally extended outwardly from casing 34 in alignment with the extended position of slide assembly C, whereby at the appropriate time during a rope tying cycle, the end of the slide assembly contacts and actuates the trigger arm 46.

The trigger latch mechanism 44 further comprises a catch actuating arm 54 engageable in a slot formed in catch 56 which in turn is mounted slidably in frame 35ᵃ for relative reciprocal movement from an extended position, as shown in Fig. 4, to a retracted position, as shown in Fig. 8. A spring 57 interposed between frame 35ᵃ and the inner end of catch 56 functions to normally spring bias said catch to its extended position.

A retainer plate or arm 51 is pivotally mounted as at 52 to end plate 53 of housing 34. Again and as will more fully appear, the retainer plate is adapted to be swung from its position shown in Fig. 4 to a position contacting and overlying the bobbin head 37 (as shown in Fig. 1) to maintain the overhand knot 13 of the rope engaged to the bobbin head during tying operations.

The shuttle assembly, heretofore indicated generally at 36, comprises more specifically a carriage body 58 carrying a roller bearing 59 mounting the body 58 for slidable movement on the shuttle frame or trackway 61. Carriage body 58 also rotatably supports a sheave 62 about which wire 72 is looped. Additionally, the previously mentioned spring tensioned wires 28 and 29 extending upwardly into casing 34 from tubular handle 19 are secured as at 28ᵃ to the carriage body 58. The spring tensioned wires function to maintain the carriage body 58 in roller bearing contact with guideway 61, and to cause the shuttle head 63 to inwardly upset or tilt when trip assembly 64 is actuated in a manner to be described hereinafter.

More specifically, mechanism 64 comprises a trip gate 66 hinged at 67 to frame 61. Gate 66 is normally spring biased to its latched position as shown in Fig. 4 by a spring 68. The gate is maintained in latched position during certain sequences of the tying operations by the slidable catch 56 which, in its extended position as shown in Fig. 4, engages and supports the underside of the gate 66. As shown in Fig. 8, when the trigger mechanism 44 is actuated to retract catch 56, the roller bearing 59 carried by body 58 will cause gate 66 to open whereby shuttle head 63 will tilt or upset inwardly to cause release of the rope engaged by said shuttle head.

Carriage body 58 of the shuttle mechanism is normally maintained in retracted position as shown in Fig. 4 under influence of the spring tensioned wire 27 which is connected at its upper end to a pin 69 carried by the base end of arcuate slide component 71 of slide assembly C. Also connected to pin 69 is aforementioned connecting wire 72 which is looped over a fixed sheave 73 and thence around sheave 62 of the shuttle assembly and with its opposite end anchored by a clamping plate 74 screwed to end plate 53 of casing 34. The fixed sheave 73 is rotatably mounted about a fixed axle 76 extending transversely to casing 34. Slide component 71 is formed with an arcuate slot 77 through which the axle 76 projects whereby relative slidable movement of component 71 may occur without interference from the fixed axle 76.

A hinged retainer plate 60, substantially equivalent to retainer plate 51 above mentioned, is hingedly mounted at 60a to end plate 53 of casing 34, whereby said retainer plate 60 may be hingedly swung into and out of overlying engagement with shuttle head 63 for the purpose of maintaining a rope noose applied to the shuttle head during rope tying operations.

The arcuate slide assembly C comprises, in addition to slide component 71, an intermediate double-plate housing section 78, and an outer end section or tip 79 pivotally secured to section 78 by pin 81. As above indicated, the slide assembly components 71, 78 and 79 are adapted to move as a unitary slide unit within arcuate casing 34 of the head component B.

Section 78 comprises, more specifically, first and second parallel arcuate plates 71 and 82 held in spaced relation by spacers 84. A pawl 86, releasably engageable within a slot 87 formed in end plate 43 of head section B, is reciprocally mounted between plates 71 and 82 adjacent its inner end. As will more fully appear, the pawl 86 is adapted to engage slot 87 to momentarily lock the entire slide assembly C in its fully extended position toward the conclusion of a tying cycle of the device. The pawl 86 is actuated by a bell crank pivotally mounted by pin 88 between plates 82 and 83 and having one arm 89 connected to pawl 86 and disposed with its other arm 91 at right angles thereto. A spring 92 interposed between arm 91 and the pawl guideway 93 exerts a spring force normally tending to bias the pawl 86 upwardly against the inside surface of plate 43, and into engagement with slot 87 formed in said end plate when the slide assembly moves to extended position whereat pawl 86 and slot 87 are brought into registry.

Arm 91 of the bell crank is also connected, via a connector slide 94, to the end plate section 79 of the slide assembly. The connector slide 94 is slidably mounted between two parallel guide plates 96 rigidly mounted between housing plates 82 and 83. As shown particularly in Fig. 8, the outer end 94a of the connector slide is spring biased into abutting engagement against the inner end face 97 of end plate 79 at a point remote from pivot pin 81 connecting end plate 79 to intermediate section 78. The connector slide 94 is maintained in spring biased contact against face 97 of the plate 79 under force of spring 92, heretofore mentioned, and supplemental spring 98 which is interposed between extension 99 affixed to inner guide plate 96, and an extension 101, rigidly secured to connector slide 94.

As will more fully appear, at the conclusion of the knot tying cycle of the device, the final tug or jerk exerted on the standing part of the rope to complete the tie will cause end plate 79 to pivotally swing to its position shown in dotted lines at 79a (Fig. 8) about the axis of pivot pin 81. This, in turn, will cause the rear face 97 to swing rearwardly and thereby force connector slide 94 correspondingly rearwardly against the combined forces of springs 92 and 98. Rearward movement of the connector slide will also swing arm 91 of the bell crank rearwardly which latter movement will cause pawl 86 to be reciprocated out of engagement from slot 87. The limits of swingable movement of plate 79 about axis 81 is determined by the length of a slot 102 through which a stop pin 103, carried between the outer ends of plates 82 and 83, projects.

Section 78 of the slide mechanism is also provided with a guide peg 104 projecting outwardly through a slot 106 formed in side plate 41 of casing 34. The outer end of plate 41 is also formed with a fixed slack take-up pin or peg 107 the function of which will become clear hereinafter. Releasable rope retainers or spring clamps such as indicated at 108 and 109, respectively, are mounted to casing 34 exteriorly thereof to guide and retain the running part of the rope when it is threaded properly to the device.

The use and operation of the device will now be described:

With the slide assembly in its fully retracted position and with the other operating parts of the mechanism in normal position as shown particularly in Fig. 4, the rope or twine to be secured about a tree limb or other body is threaded to the device substantially in the manner shown in Fig. 1. More specifically, the operator first ties an overhand knot 13 in the standing part of the rope 11. The bight of the overhand is positioned around bobbin head 37 and shuttle head 63. The hinged retainers 51 and 60 may thence be swung downwardly in overlying contact with the bobbin and shuttle, respectively. The running part of the rope 14 is extended around the profile of head assembly B, and the running end 16 of the rope is attached to the outer tip of slide component 79. More specifically, the intermediate portions of the running part 14 of the rope may be releasably maintained to the head portion B by spring clips or retainers 108 and 109. A slack take-up loop substantially S-shaped in configuration is engaged around fixed peg 107 and moving peg 104 as shown in Fig. 1. The running end of the rope is formed with a tight overhand 17 engaged around the narrow pointed end of slide component 79, also as shown in Fig. 1. The standing part 11 of the rope is guided through member 30 and may be extended from that point generally along the axis of the handle 31 to the operator of the mechanism.

With the rope threaded in the device in the manner above described, the hook-shaped head portion B can be engaged or hooked around the tree limb or other body about which the noose is to be tied. Thereupon the tie may be completed simply by an operator sharply pulling or tugging on the standing part 11 of the rope. When tension is applied to the rope through pulling or jerking on the standing part of the line, the effect will be to cause the overhand rope 13 to tighten and close.

This will force the shuttle 36 to move along its guideway 61 toward the bobbin 34, which, in turn, will cause slide assembly C to move from its retracted position toward its extended position by virtue of the wire 72 and sheave 62—73 connections between the shuttle and the slide component 71. In this connection, movement of the sheave 62 away from fixed sheave 73 will cause the connecting wire 72 at its point of connection to pin 69 to move in an opposite direction, or, in a direction appropriate to cause the slide 71 to move from its retracted to extended position. Continued movement of the slide toward extended position will bring the outer end of slide component 79 into engagement against trigger arm 46 and will force the trigger arm inwardly within casing 34. In a manner previously described, when the trigger arm is forced inwardly, both the bobbin and shuttle heads 37 and 63 will be caused to upset or tilt toward one another and thereby release the overhand knot 13 from supported engagement on the bobbin and shuttle. It is appreciated, of course, that before the slide component 79 actuates the trigger mechanism 44, the tip end of the slide component carrying the knotted running end 16 of the rope must move to a position projected through the overhand loop 13 whereby when the bobbin and shuttle upset to release the overhand 13, it will tighten around the running end of the rope inwardly of and adjacent the knotted protuberance 17.

In order to insure against the slide elements 79 retracting prematurely before tightening of the overhand 13 around knotted end 17 of the rope, the heretofore described slide locking mechanism comprising pawl 86 is provided. More specifically and as above explained, when the slide is moved to its fully extended position, pawl 86 will have been moved into registry and engagement with slot 87 formed in plate 43 of casing 34. As long as the pawl remains engaged in the slot 87, the slide mechanism is prevented from retracting. It is only when sufficient tug or pull has been exerted on the standing part of the rope by the operator after the overhand 13 has tightened around tip 79 that the latter will be swung about its axis 81 causing disengagement of pawl 86 from engagement within slot 87. In this regard, it will be recalled that when slide component 79 is swung to its position as shown in dotted lines at 79a, the rearward face 97 of the slide component will force slide connector 94 rearwardly against bell crank arm 91 which, in turn, through its arm connection 89 with pawl 86 will force the latter out of disengagement from slot 87 and thus permit the slide assembly to retract under influence of the spring tensioned wires 27 and 29 connected to pin 69 of the slide assembly. Once the mechanism has completed its cycle of tying operation as above described the hook-shaped head B of the device may be disengaged from engagement around the tree limb or other body and placed in readiness for a new cycle of operation.

In utilizing the present device for tying the fruit laden limbs of orchard trees, it is feasible and economical to use the device to tie nooses around the primary or vertical limbs of the tree, and after each such tie is completed, to then cut the standing part of the rope at a preselected point which may then be secured about one of the fruit bearing or lateral limbs of the tree whereby the fruit bearing limb is supported by the rope connection to the main or vertical limbs about which the noose 12 has been tied.

To facilitate tying of the fruit laden limb to the primary limb about which a noose has been already tied using the present device, we provide the vertically slidable jack on the handle portion 31 of the implement to temporarily support the weight of the fruit laden limb while the final hand-tie of the rope is completed around said limb. Thus, for example, in conventional practice, it is usual and desirable after the first tie of the rope has been completed around a primary or vertical limb, to manually lift the fruit bearing limb upwardly so that when the rope tie between the two limbs is completed, a portion of the weight of the fruit laden branch will be supported by the rope under tension. As above indicated, the slidable jack D may be utilized to temporarily support the weight of a fruit laden branch during the interval that an operator makes the final rope tie therearound.

More specifically, the mechanism D is constructed to function as a slidable friction clutch relative to the handle 31 and upper tubular housing 19 which are of the same outside diameter. The mechanism comprises a sliding shoe consisting of two half-sleeve portions 111 and 112 each arcuately contoured to slidably embrace the circumference of the handle 31 and upper tubular housing 19. The half-sleeve 112 is located to the same side as, and below, the jack extension arm 113; whereas, the half-sleeve segment 111 is disposed to the opposite side, and above, said arm 113. The nature and construction of the device is such that the clutch component can be tilted or rocked about the point or plane where the inner end of jack arm 113 bears against the handle 31 (see Fig. 12), whereupon the entire unit may be freely, slidably moved upwardly or downwardly relative to the handle 31 to any desired position thereon. A coil spring 114 connecting opposite vertical edges of segment 112 functions to normally spring bias the clutch mechanism to its position shown in full lines in Figs. 1 and 12. When a load is applied to arm 113 (such as the weight of a fruit laden branch supported thereon), the lower extremities of segment 112 and the upper extremities of segment 111 will, through leverage action, bear against adjacent surfaces of the handle 31 and function to maintain the jack in secure frictional engagement with the handle to prevent downward slippage thereof under force of the load supported on arm 113. Fig. 3 of the drawings illustrates how the butt end of the handle 31 may be placed on the ground and the jack mechanism D slidably positioned on the handle immediately below and in load supporting engagement with a fruit laden branch during the interval that the final hand-tie is made around said limb.

Fig. 3 also illustrates how a ball of rope or twine to be used in the device can be conveniently carried within a receptacle 116 mounted directly to the handle adjacent the lower regions thereof for convenient accessibility by an operator.

Although the present invention has been described in some detail by way of illustration and example for purposes of clarity of understanding, it is understood that certain changes and modifications may be made within the spirit of the invention as limited only by the scope of the claims appended hereto.

We claim:

1. A device for completing the tie of a rope noose around a body such as a tree limb and in which the completed noose is defined by an overhand knot in the standing part of the rope embracing the running part of the rope and in which the running end is secured against slippage through said overhand by a protuberance, comprising: a generally hook-shaped head portion defining a base end and an outer end adapted to partially circumscribe the body to be tied; first and second overhand knot supporting members carried adjacent the base portion of said head and facing toward the outer end of said head adapted to support an open overhand loop formed in the standing part of a rope; an arcuate slide carried by said head slidably extensible from a retracted position adjacent the outer end of said head to an extended position adjacent the base end of said head and between said first and second members; rope guide means carried by said head and slide for supporting the running part of said rope in general conformity with the profile of said head and slide; means for releasably affixing the running end of the rope to the outer end of said slide for corresponding movement of said running end with said slide from retracted to extended positions and whereby in extended position, said running end is projected through said overhand loop supported on said members; operating means actuatable upon tightening of said overhand loop supported on said members for moving said slide from its retracted to extended position; and means including a trigger mechanism actuatable upon tightening of said loop and upon movement of said slide from its retracted to extended position for causing release of said overhand loop supported by said members to permit said loop to be tightened around the running part of said rope adjacent the running end thereof.

2. A device for completing the tie of a rope noose around a body such as a tree limb and in which the completed noose is defined by an overhand knot in the standing part of the rope embracing the running part of the rope, and in which the running end extremities are secured against slippage through said overhand by a protuberance, comprising: a generally open hook-shaped head portion defining a base end and an outer end adapted to partially circumscribe the body to be tied; a bobbin assembly and a shuttle assembly mounted to the base portion of said head in spaced relation and adapted to support an open overhand loop formed in the standing part of a rope; said shuttle mounted for reciprocal movement relatively toward and away from said bobbin; spring means normally biasing said shuttle away from said bobbin; said shuttle movable toward said bobbin against the force of said spring means upon tightening of a said overhand loop supported by said bobbin and shuttle; an arcuate slide carried by said head slidably extensible from a retracted position adjacent the outer end of said head to an extended position located adjacent the base end of said head and between said bobbin and shuttle; rope guide means carried by said head and slide for supporting the running part of said rope in general conformity to the profile of said head and slide; means for releasably affixing the running end of the rope to the outer end of said slide for corresponding movement of said running end with said slide from retracted to extended position and whereby in extended position, said running end is projected through said overhand loop supported on said guide members; operating means actuatable upon tightening of said overhand loop supported by said bobbin and shuttle for moving said slide from its retracted to extended positions; said bobbin and shuttle upon being moved relatively toward one another upon tightening of said overhand loop also mounted to tiltably upset from overhand loop supporting position toward one another to release said overhand loop supported thereby; releasable latch means normally maintaining said bobbin and shuttle in loop supporting position; and means including a trigger mechanism operable upon movement of said slide from its retracted to extended position for deactuating said latch means to permit said bobbin and shuttle to tiltably upset toward one another to effect release of a said overhand loop supported by said bobbin and shuttle, whereby said loop is free to tighten around the running part of said rope adjacent the running end thereof upon tension being applied to the standing part of said rope sufficient to cause tightening of said overhand loop.

3. The combination of claim 2 and wherein means are provided for normally biasing said slide toward retracted position, and wherein said operating means for moving said slide from its retracted to extended positions includes means interconnecting said slide with said shuttle operable to impart movement to said slide from its retracted to extended positions upon movement of said shuttle toward said bobbin under influence of forceful tightening of said overhand loop supported by said bobbin and shuttle.

4. The combination of claim 2 and wherein said trigger mechanism comprises a trigger arm operatively connected to said latch means; said trigger arm mounted to the base portion of said head between said bobbin and shuttle in the locus of the extended position of said slide; the outer end of said slide engageable against said trigger arm to cause deactuation of said latch means when said slide is moved to extended position.

5. The combination of claim 2 and wherein spring means are provided to normally urge said slide toward retracted position; said slide comprising an intermediate section and an outer end section pivotally supported to said intermediate section; mutual engageable locking means on said intermediate slide section and casing positioned relative to one another to mutually engage and releasably lock said slide against retraction when said slide is moved to fully extended position; means for deactuating said locking means; said last named means comprising said outer section and means interconnecting said outer section with said locking means; said pivoted outer section swingable from a first position, whereat said interconnecting means is inoperative to deactuate said locking means, to a second position, whereat said interconnecting means is operated to deactuate said locking means; means normally biasing said pivoted section toward its first position; said pivoted section movable to its second position under influence of tension applied to the standing part of a said rope in which the said overhand loop thereof has been released from said bobbin and shuttle and has tightened around the running end of the rope and around the outer end of said pivoted slide section to which the running end is engaged.

6. A device for completing the tie of a rope noose around a body such as a tree limb and in which the completed noose is defined by an overhand knot in the standing part of the rope embracing the running part of the rope and in which the running end is secured against slippage through said overhand by a protuberance, comprising: a generally open hook-shaped head portion defining a base and an outer end adapted to partially circumscribe the body to be tied; first and second overhand knot supporting guide members carried adjacent the base portion of said head and facing toward the outer end of said head adapted to support an open overhand loop formed in the standing part of a rope; an arcuate slide carried by said head slidably extensible from a retracted position adjacent the outer end of said head to an extended position located adjacent the base end of said head and between said first and second guide members; spring means biasing said slide toward its retracted position; said slide including an intermediate section and an outer end section pivotally supported to said intermediate section; rope guide means carried by said head and slide for supporting the running part of said rope in general conformity to the profile of said head and slide; means for releasably affixing the running end portion of the rope to the outer end section of said slide for corresponding movement of said running end with said slide from retracted to extended position and whereby in extended position said running end is projected through said overhand loop supported on said guide members; operating means actuatable upon tightening of said overhand loop supported by said bobbin and shuttle for moving said slide from its retracted to extended position; and means including a trigger mechanism actuatable upon tightening of said loop and upon movement of said slide from its retracted to extended position for causing release of said overhand loop supported by said guide members to permit said loop to be tightened around the running part of said rope adjacent the running end portion thereof and around the outer end section of said slide; mutual engageable locking means on said intermediate slide section and head positioned relative to one another to mutually engage and releasably lock said slide against retraction when said slide is moved to fully extended position; means for deactuating said locking means; said last named means comprising said outer end section and means interconnecting said outer section with said locking means; said pivoted outer section swingable from a first position, whereat said interconnecting means is inoperative to deactuate said locking means, to a second position, whereat said interconnecting means is operated to deactuate said locking means; means normally biasing said pivoted section toward its first position; said pivoted section movable to its second position under influence of tension applied to the standing part of a said rope in which the said overhand loop thereof has been released from said guide members and has tightened around the running end of the rope and around the outer end of said pivoted slide section to which the running end is engaged.

7. The combination of claim 6 and wherein said trigger mechanism comprises a trigger arm operatively connected to said latch means; said trigger arm mounted to the base portion of said head between said guide members in the locus of the extended position of the outer end of said slide; the outer end of said slide engageable against said trigger arm to cause deactuation of said latch means when said slide is moved to extended position.

8. The combination of claim 6 and wherein said mutual engageable locking means comprises a spring loaded pawl carried by said intermediate slide section engageable in a slot formed in said head portion when said slide is moved to fully extended position; and wherein said interconnecting means comprises a connecting rod carried by the intermediate section of said slide connected at its opposite ends to said pawl and said outer pivoted section respectively; said connecting rod operative to retract said pawl from said slot when said outer section is swung from its first to second positions.

9. A device for completing the tie of a rope noose around a body such as a tree limb and in which the completed noose is defined by an overhand knot in the standing part of the rope embracing the running part of the rope, and in which the running end extremities are secured against slippage through said overhand by a protuberance, comprising: a generally open hook-shaped head portion defining a base end an an outer end adapted to partially circumscribe the body to be tied; a bobbin assembly and a shuttle assembly mounted to the base portion of said head in spaced relation and adapted to support an open overhand loop formed in the standing part of the rope; said shuttle mounted for reciprocal movement relatively toward and away from said bobbin; spring means normally biasing said shuttle away from said bobbin; said shuttle movable toward said bobbin against the force of said spring means upon tightening of a said overhand loop supported by said bobbin and shuttle; an arcuate slide carried by said head slidably extensible from a retracted position adjacent the outer end of said head to an extended position located adjacent the base end of said head and between said bobbin and shuttle; spring means biasing said slide toward its retracted position; said slide including an intermediate section and an outer end section pivotally supported to said intermediate section; rope guide means carried by said head and slide for supporting the running part of said rope in general conformity to the profile of said head and slide; means for releasably affixing the running end of the rope to the outer end of said slide for corresponding movement of said running end with said slide from retracted to extended position and whereby in extended position, said running end is projected through said overhand loop supported on said bobbin and shuttle; operating means actuatable upon tightening of said overhand loop supported by said bobbin and shuttle for moving said slide from its retracted to extended positions; said bobbin and shuttle, upon tightening of said overhand loop, also mounted to tiltably upset from overhand loop supporting position toward one another to release said overhand loop supported by said bobbin and shuttle; releasable latch means normally maintaining said bobbin and shuttle in loop supporting position; and means including a trigger mechanism operable upon tightening of said loop and upon movement of said slide from its retracted to extended position for deactuating said latch means to permit said bobbin and shuttle to tiltably upset toward one another to effect release of said overhand loop supported by said bobbin and shuttle, whereby said loop is free to tighten around the running part of said rope adjacent the running end thereof upon tension being applied to the standing part of said rope; mutual engageable locking means on said intermediate slide section and head portion positioned relative to one another to mutually engage and releasably lock said slide against retraction when said slide is moved to fully extended position; means for deactuating said locking means; said last named means comprising said outer end and means interconnecting said outer section with said locking means; said pivoted outer section swingable from a first position, whereat said interconnecting means is inoperative to deactuate said locking means, to a second position, whereat said interconnecting means is operated to deactuate said locking means; means normally biasing said pivoted section toward its first position; said pivoted section movable to its second position under influence of tension applied to the standing part of a said rope in which the said overhand loop thereof has been released from said bobbin and shuttle and has tightened around the running end of the rope and around the outer end of said pivoted slide section to which the running end is engaged.

10. The combination of claim 9 and wherein said operating means for moving said slide from its retracted to extended positions includes means interconnecting said slide with said shuttle operable to impart movement to said slide from its retracted to extended positions upon movement of said shuttle toward said bobbin under influence of forceful tightening of said overhand loop supported by said bobbin and shuttle.

11. The combination of claim 6 and wherein said mutual engageable locking means comprises a spring loaded pawl carried by said intermediate slide section engageable in a slot formed in said head portion when said slide is moved to fully extended position; and wherein said interconnecting means comprises a connecting rod carried by the intermediate section of said slide connected at its opposite ends to said pawl and said outer pivoted section respectively; said connecting rod operative to retract said pawl from said slot when said outer section is swung from its first to second positions.

12. A rope knot comprising: an overhand knot formed in the standing part of said rope tightly embracing the running part thereof inwardly of the running end; a knotted protuberance formed adjacent the running end of said rope to prevent slippage of the running end through said overhand; the running part of said rope extending from said overhand to said knotted protuberance defining a closed noose.

References Cited in the file of this patent
UNITED STATES PATENTS

| | | |
|---|---|---|
| 1,830,208 | Norling | Nov. 3, 1931 |
| 2,543,625 | Ghillany | Feb. 27, 1951 |
| 2,610,631 | Calicchio | Sept. 16, 1952 |
| 2,700,252 | Paganelli | Jan. 25, 1955 |